No. 828,243.　　　　　　　　　　　　　　　PATENTED AUG. 7, 1906.
J. F. POLMANN.
HOSE COUPLING.
APPLICATION FILED AUG. 12, 1905.

WITNESSES:

INVENTOR
John F. Polmann
BY
ATTORNEYS

UNITED STATES PATENT OFFICE.

JOHN FREDERICK POLMANN, OF WALLINGTON, NEW JERSEY.

HOSE-COUPLING.

No. 828,243.  Specification of Letters Patent.  Patented Aug. 7, 1906.

Application filed August 12, 1905. Serial No. 273,925.

*To all whom it may concern:*

Be it known that I, JOHN FREDERICK POLMANN, a citizen of the United States, and a resident of Wallington, in the county of Bergen and State of New Jersey, have invented a new and Improved Hose-Coupling, of which the following is a full, clear, and exact description.

This invention relates to improvements in couplings for hose or pipes, the object being to provide a threadless coupling so constructed as to prevent any possible leaking at the joint and to provide for a quick coupling of parts.

I will describe a hose-coupling embodying my invention and then point out the novel features in the appended claims.

Reference is to be had to the accompanying drawings, forming a part of this specification, in which similar characters of reference indicate corresponding parts in both the views.

Figure 1:
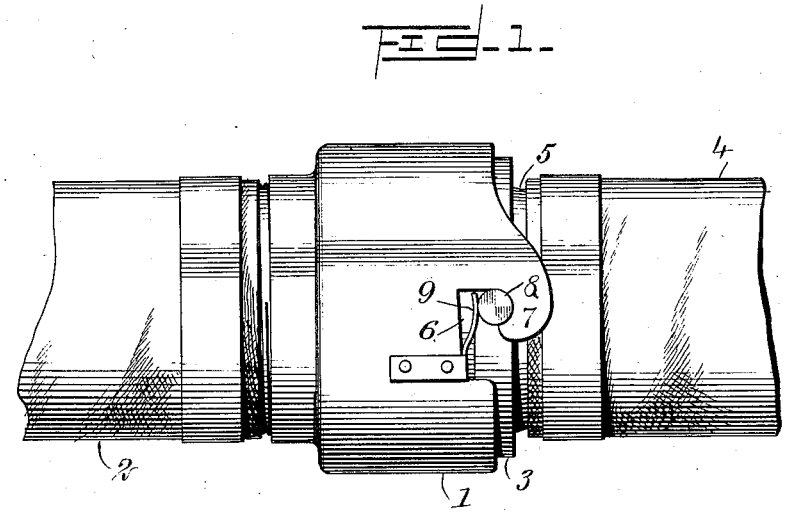
Figure 2:
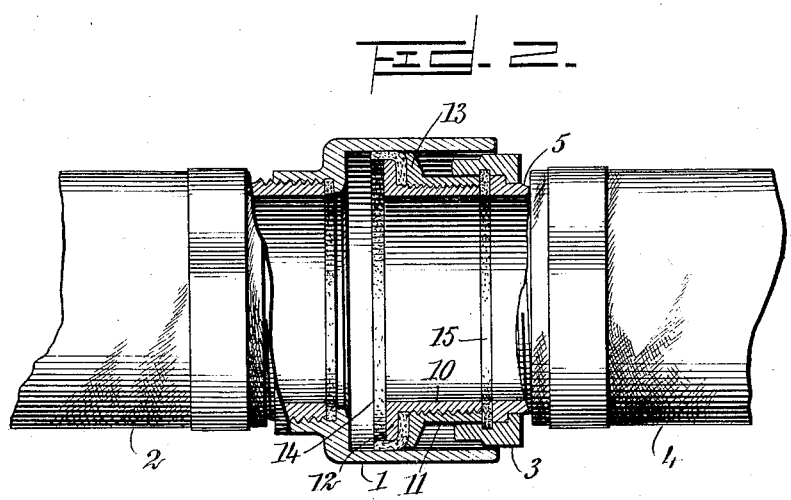

Figure 1 shows in plan a coupling embodying my invention, and Fig. 2 is a sectional view thereof.

The coupling comprises an outer casing or member 1, designed to be connected to the end of a hose-section 2, and an inner member 3, designed to be secured to the end of another hose-section 4. This member 3 is mounted to rotate on a tube 5, to which the hose-section 4 is connected. At opposite sides the outer member 1 has slots 6, terminating in hooks 7, with which lugs 8 on the member 3 are designed to engage, and when the parts are attached the lugs will be prevented from accidental detachment from the hooks 7 by means of springs 9, attached to said member 1 and pressing against the lugs.

Arranged within the coupling is a tubular core consisting of an inner section 10 and an outer section 11, the sections having screw-thread engagement, and the core-sections engage with the members 3. On the inner end of the section 10 is an annular flange 12, and a similar flange 13 is formed on the section 11. These flanges form clamping-jaws for a packing-ring 14, consisting of leather or other suitable material, and the end of this packing projects slightly inward of the flange 12, and the packing is designed to engage closely against the interior of the casing 1, as clearly indicated in Fig. 2. A packing-ring 15 is placed between the core and the tube 5. While this core permits of the free passage of water, it will prevent leakage around the coupling.

Having thus described my invention, I claim as new and desire to secure by Letters Patent—

1. A hose-coupling comprising an outer member or casing, an interlocking inner member, a tubular core arranged within said members, and packing-rings at the ends of the core.

2. A hose-coupling comprising an outer member or casing, an inner member for interlocking with the outer member, a tubular core within said outer and inner members and consisting of inner and outer sections provided with annular flanges, and a packing clamped between said flanges.

3. A hose-coupling comprising an outer member, an inner member for interlocking with the outer member, a tubular core within the inner and outer members and consisting of an inner section and an outer section, the said sections having screw-thread engagement and each section having at the inner end an outwardly-extended annular flange, and a packing clamped between said flanges.

In testimony whereof I have signed my name to this specification in the presence of two subscribing witnesses.

JOHN FREDERICK POLMANN.

Witnesses:
CHRIS. DE KEYSER,
CORNELIUS A. BAKER.